United States Patent [19]
Giles

[11] Patent Number: 5,481,391
[45] Date of Patent: Jan. 2, 1996

[54] OPTICAL FIBER SYSTEM AND METHOD FOR OVERCOMING THE EFFECTS OF POLARIZATION GAIN ANISOTROPY IN A FIBER AMPLIFIER

[75] Inventor: Clinton R. Giles, Middletown, N.J.

[73] Assignee: AT&T Corp., Murray Hill, N.J.

[21] Appl. No.: 198,011

[22] Filed: Feb. 17, 1994

[51] Int. Cl.⁶ .......................... H04B 10/16; H04B 10/02; H01S 3/00

[52] U.S. Cl. .......................... 359/179; 359/173; 359/174; 359/333; 359/341; 385/11

[58] Field of Search ................................. 359/160, 161, 359/156, 173, 341, 179, 124, 333, 337, 174; 385/11; 372/6

[56] References Cited

U.S. PATENT DOCUMENTS

| | | | |
|---|---|---|---|
| 5,089,786 | 2/1992 | Tamura | 359/333 |
| 5,272,560 | 12/1993 | Baney et al. | 359/341 |
| 5,276,543 | 1/1994 | Olshansky | 359/124 |
| 5,276,549 | 1/1994 | Tagawa et al. | 359/337 |
| 5,285,306 | 2/1994 | Heideman | 359/160 |
| 5,287,216 | 2/1994 | Chirravuri et al. | 359/341 |
| 5,299,048 | 3/1994 | Suyama | 359/179 |
| 5,303,314 | 4/1994 | Duling, III et al. | 385/11 |

FOREIGN PATENT DOCUMENTS

| | | | |
|---|---|---|---|
| 0516363 | 12/1992 | European Pat. Off. | 359/160 |
| 0523766 | 1/1993 | European Pat. Off. | 359/174 |
| 4104131 | 4/1992 | Japan | 359/341 |
| 4156433 | 5/1992 | Japan | 359/341 |

*Primary Examiner*—Leo H. Boudreau
*Assistant Examiner*—Bhavesh Mehta

[57] ABSTRACT

An optical fiber system and method is disclosed that overcomes the effects of polarization gain anisotropy in rare-earth doped optical fiber amplifiers. An optical fiber has at least one rare-earth doped fiber portion for amplifying a light signal. Light signals are passed through the doped fiber portion in a first incident polarized state. This light signal is reflected back from a Faraday effect mirror and through the doped fiber portion in its orthogonal polarized state so as to overcome the effects of polarization gain anisotropy. The rare-earth doped amplifier is preferably an erbium-doped fiber amplifier. A signal is initially passed through one part of a Faraday optical circulator and out a second port into the doped amplifier. On its return pass, the light signal enters the second port and then exits a third port. The optical amplifier can include a wavelength division multiplexor coupler for merging the pump signal with the original light signal. Various amplifier configurations are also disclosed which are either co-propagating or counter-propagating and reflect only the signal, reflect only the pump signal, or reflect both the pump signal and original light signal.

29 Claims, 7 Drawing Sheets

OPTICAL FIBER SYSTEM AND METHOD FOR OVERCOMING THE EFFECTS OF POLARIZATION GAIN ANISOTROPY IN A FIBER AMPLIFIER

FIELD OF THE INVENTION

This invention relates to an optical fiber system and method for overcoming the effects of polarization gain anisotropy in a rare-earth doped fiber amplifier.

BACKGROUND OF THE INVENTION

Long distance optical communication systems, such as used in transoceanic fiber systems require regenerators or amplifiers to regenerate and amplify the information bearing light signal that attenuates as it moves through the optical fiber. Typically, a single-mode fiber system can transmit 2.4 GBit/s of digital information over distances of 30–50 kilometers before the signal's attenuation requires amplification.

Prior art amplification devices include electro-optic regeneration-repeaters which convert an optical signal into electronic form for amplification. An electro-optic regeneration-repeater is similar to an optical receiver and transmitter placed back-to-back so that the receiver output drives the transmitter. Appropriate electronic circuits digitally "clean up" and regenerate the signal.

Although the electro-optic regeneration-repeaters do amplify the signal adequately, they are complex. In a transoceanic fiber optic system, these regeneration-repeaters may be inadequate because their complexity requires greater maintenance than desired. The ocean depths where such systems require a less complex amplification system.

For transoceanic systems, it would be more desirable to use an optical amplifier which is conceptually simpler than an electro-optic regenerator. Optical amplifiers boost the optical signal strength internally without converting the signal into electrical form. Optical amplifiers use fibers doped with rare-earths, and work on stimulated emission principles similar to lasers, but designed to amplify signals from an external source rather than generate their own light.

The most common type of optic amplifier is an erbium-doped amplifier. These erbium-doped amplifiers work in the wavelength region of about 1530 to 1560 nm and use an external pump light signal to stimulate the erbium ions, which give off photon energy when stimulated. It has been found that a pump wavelength of around 530, 670, 800, 980, and 1480 nm is sufficient to provide amplification of as high as 40 dB in many of these optical amplifiers. At the output of the amplifier, there is an amplified signal with the pump power effectively converted into the signal power.

One drawback of an optical amplifier system is the production of an amplified spontaneous emission (ASE). Some of this emission (ASE) will be in the same wavelength band as the signal and behave as noise, causing a signal-to-noise degradation. Any out-of-band ASE can be filtered, but the in-band ASE cannot be filtered.

The in-band ASE-induced noise causes "signal spontaneous beat noise". As the signal progresses from one optical amplifier to the next and then through subsequent amplifiers, the ASE is added together. As the ASE builds up it becomes a component of the total output power from the amplifiers, thus robbing the system of signal power not only from the standpoint of the signal-to-noise ratio, but also from the standpoint of the finite saturated output power available from an amplifier.

In addition to the problem of induced ASE, there are also the amplification problems caused by a second order effect related to the polarization of the light signal. When a linearly polarized light signal is amplified, the gain of the amplifier is saturated slightly more in the signal polarization than orthogonal to it. This effect is referred to as polarization holeburning. The erbium ions located in the glass of the fiber have an anisotropy so that we have a preferential stimulation of ions which have a local field orientation. That subpopulation of erbium ions will see more saturation and provide more of the gain to the signal. Additionally, at the same time, the ASE builds up in the polarization orthogonal to that of the incident light signal.

These drawbacks would not exist if the signal light were circularly polarized so that the signal light automatically sampled all the subpopulation of the erbium ions. The circularly polarized light would insure that there was no gain difference in one axis of the transmission.

Some prior art amplification systems have attempted to scramble the signal polarization at the source. For example, two close wavelengths generated from a laser transmitter could be transmitted to the same modulator of the transmitter. This enables random polarization of the signal, thereby preventing gain anisotropy caused by a linearly-polarized signals. However, such system may impose other design constraints so that the transmitter design is not as effective as desired.

SUMMARY OF THE INVENTION

The foregoing disadvantages of the prior art optical amplification systems has been overcome by the advantages, benefits and advances made with the present invention. An optical fiber system includes a reflector that reflects the light signal back through the doped fiber portion in its orthogonal polarized state so as to suppress polarization gain anisotropy. The Faraday rotation of the light signals at the Faraday mirror of a double-pass erbium-doped fiber amplifier has been found to be an effective means of cancelling the effects of polarization hole burning and polarization-dependent gain.

In a preferred aspect of the invention, the reflector comprises a Faraday effect mirror. In a reflection amplifier using an optical circulator for input and output ports, the polarization hole burning and polarization dependent gain anisotropy in an amplifier having an eleven dB gain compression was reduced from a mean value of 0.28 dB.

In one aspect of the invention, the light is first passed into a Faraday optical circulator which allows the reflected signal to pass outward through a third port.

In another aspect of the invention, the amplifier can have various configurations including:

1. Co-propagating and counter-propagating amplifiers that reflect only the signal;
2. Co-propagating and counter-propagating amplifiers that reflect only the pump signal; and
3. Co-propagating and counter-propagating amplifiers that reflect both the signal and pump.

DESCRIPTION OF THE DRAWINGS

The foregoing advantages of the present invention will be appreciated more fully from the following description, with reference to the accompanying drawings in which:

FIGS. 8–13 show various amplifier configurations which are possible with the present invention.

DETAILED DESCRIPTION OF THE INVENTION

The present invention provides benefits over prior art amplifiers by suppressing polarization gain anisotropy by the use of Faraday reflection and double passing the light signal through a rare-earth doped amplifier (preferably erbium-doped). For purposes of understanding this invention, the general background of the problem associated with polarization holeburning and gain anisotropy is set forth before a detailed description of the drawings and invention is described.

The microscopic anisotropy of the rare-earth doped amplifiers cause polarization holeburning and polarization-dependent gain resulting in polarization anisotropy of the gain. In the glass host, erbium-ion cross sections, $\sigma_a$, $\sigma_e$ are tensor, rather than scaler quantities. Each ion is characterized by a randomly oriented c-ellipsoid, whose shape is determined by the strength and orientation of the local field.

In an optical amplifier, those excited erbium-ions whose major axis of the $\sigma$-ellipsoid are collinear with an incident linearly-polarized optical signal are preferentially stimulated to emit photons. Consequently, in a gain-saturated amplifier this causes polarization holeburning where the amplifier gain is slightly lower in the plane of the linearly-polarized signal, relative to that in the perpendicular plane. In an analogous manner, slightly higher gain is expected in an optical amplifier along the polarization direction of a linearly-polarized pump beam. This is described as polarization-dependent gain. Both the polarization holeburning and gain typically result in gain anisotropy of approximately 100 mdB in amplifiers having 3–6 dB gain saturation.

Although the magnitude of the polarization holeburning is small relative to the amplifier gain, it may dramatically reduce the single power margin in long distance (megameter) amplified light wave systems having many amplifiers. In these long-distance systems, amplified spontaneous emission noise grows preferentially in the polarization direction orthogonal to the signal, resulting in loss of signal power. In a 3100 km transmission experiment, for example, signal-to-noise ratio fading of 2.5 dB has been attributed to polarization holeburning. Pump-induced polarization dependent gain behaves like polarization-dependent loss as its polarization axis is randomly oriented relative to the signal. The effect of polarization dependent gain on system performance is less severe than polarization holeburning.

It is possible to reduce polarization holeburning and gain anisotropy with systems other than the means of the present invention. For example, if the pump and signal beams are circularly polarized through the entire length of erbium-doped fiber, there would be little polarization holeburning and gain anisotropy. It is more practical to scramble the signal polarization from the transmitter, and the pump beam polarization in the amplifier, to ensure there is no special polarization axis and the gain is isotropic. However, this active system requires additional optics and electronics at both the transmitter and repeater locations. This is not practical for long distance, transoceanic systems. The present invention overcomes these aforementioned drawbacks by passively cancelling the gain anisotropy by a system of Faraday reflection into the doped fiber.

Referring now to FIG. 1 there is shown a transoceanic optical communication system, illustrated generally at 10, showing a plurality of spaced amplifier stations 12 containing the amplifiers of the present invention, which suppress gain anisotropy resulting from polarization holeburning and polarization dependent gain in a saturated fiber amplifier using a rare-earth dopant such as erbium. A transoceanic cable 14 forms the overall communication link of the fiber optic communication system between the transmitter 16 and receiver 18 (FIGS. 1 and 4) and is about 5,000 to 10,000 kilometers (km) long. The amplifiers can be contained in pressure sealed housings 19 and spaced typically 30 to 100 km apart.

The prior art optical amplifiers and regenerators suffer some drawbacks as compared to the system of the present invention. Rare-earth doped optical amplifiers, such as erbium amplifiers, have gain anisotropy resulting from polarization holeburning when operated in its saturated state. The present invention, on the other hand provides for substantial amplifier gain with low noise, without the ASE buildup robbing this total output power from the amplifier.

Figure 2A:
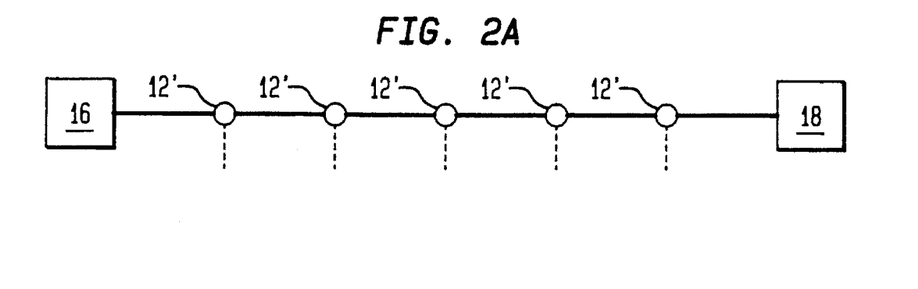
FIGS. 2A and 2B show a schematic of transmitter, amplifier and receiver stations of the prior art and a chart depicting that the signal gradually fades as caused by gain anisotropy.
Figure 2B:
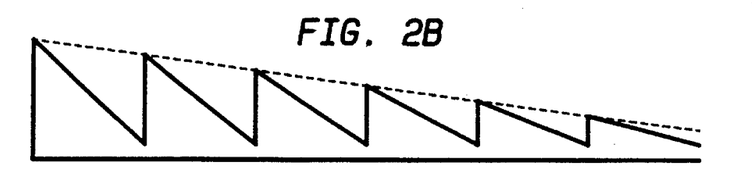
Figure 4A:
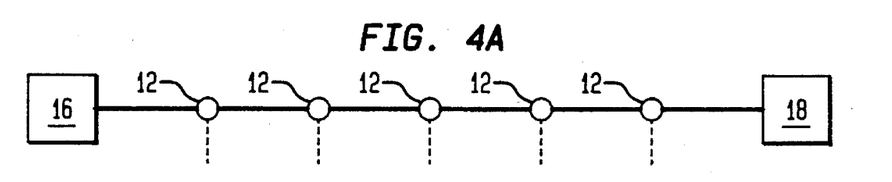
FIGS. 4A and 4B show a schematic of transmitter and receiver stations and amplifiers of the present invention and a chart depicting that the signal strength remains nearly constant because of the suppression of gain anisotropy.
Figure 4B:
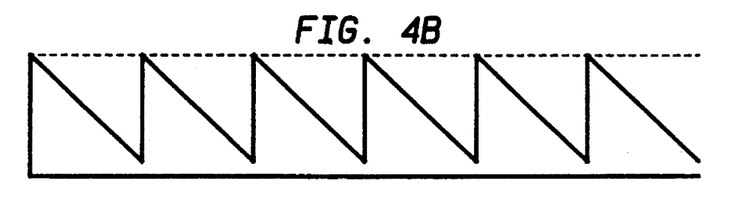
Figure 7:
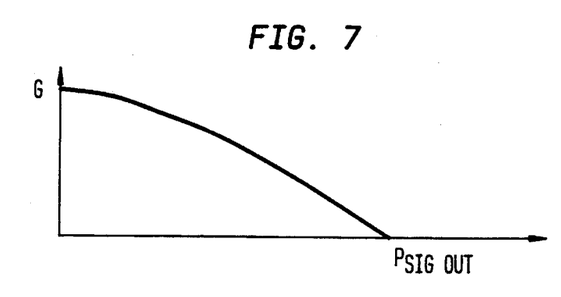
FIG. 7 is a schematic showing the gain relative to the total signal power out of the amplifier.

FIGS. 2A and 2B schematically illustrate prior art rare-earth doped optical amplifiers where a series of optical amplifiers (represented by 12') are incorporated in a long distance optical communication system. As the signal progresses through each amplifier, the ASE builds and then detracts from the total output power of the amplifier. The ASE robs the system of signal power not only from the standpoint of the signal to noise ratio, but also from the standpoint of the finite saturate operate power available from an amplifier. In a worse case scenario, the signal gradually will fade to nothing and the system would fail. We have a small signal gain which is a function of signal power out (FIG. 7). With the present invention, as shown in FIGS. 4A and 4B, the system does not "fail". The signal is amplified and the total output from the amplifiers maintains a steady rate throughout the system.

The present system is also advantageous over the prior art optical amplifiers because the system now automatically samples the subpopulation of erbium ions no matter what orientation or anisotropy of erbium ions are contained in the glass. It is not necessary to scramble the signal at the source such as by transmitting two wavelengths to the same modulator of the transmitter.

Figure 1:
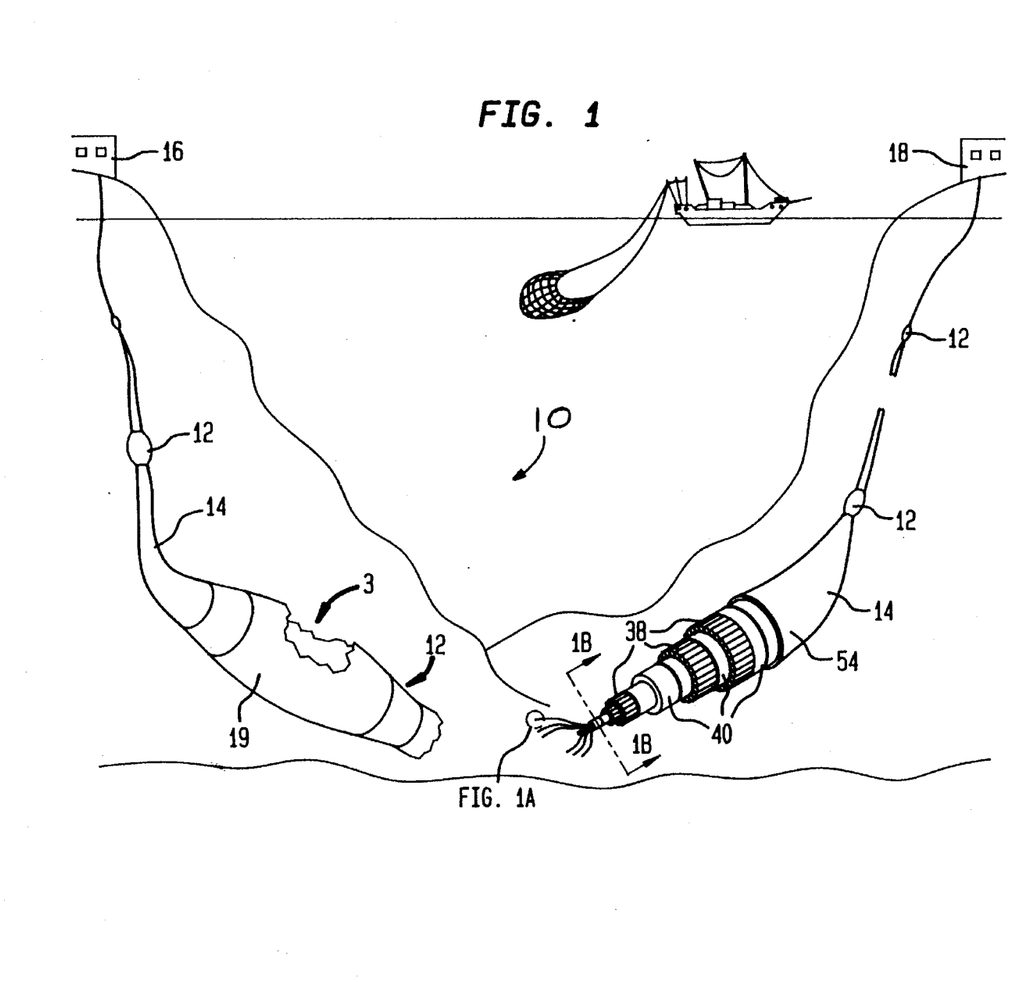
FIGS. 1A and 1B are an environmental schematic view of a long distance communication system showing the construction of a transoceanic fiber optic cable, the transmitter and receiver stations and various amplifier stations along the communication link.
Figure 1A:
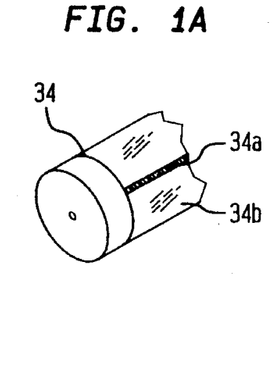
Figure 1B:
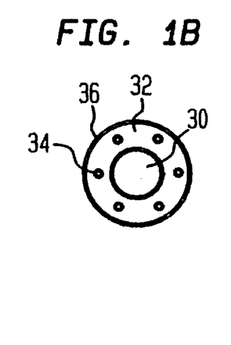

Referring now once again to FIG. 1, the transmitter 16 would include the basic components of a fiber optic transmitter such as the housing, drive circuitry, monitoring equipment and light source, as is conventional, as well as a modulator. The transmitter is incorporated into the larger transmission system of the telephone network that performs electronic functions such as multiplexing of signals. In a large transoceanic optic communication system 10, a plurality of optical fibers 34 could be included within one large transoceanic cable.

As shown in FIG. 1, the transoceanic cable 14 typically includes a core 30 and covering 32 with a plurality of the optical fibers 34 extending therethrough. A sheath 36 covers the core. An alternating series of high strength steel wires 38 and protective jackets 40 surround the sheath. The outside layer of the cable is formed by a thick corrosion resistant covering 54 to protect against the sea. This design is known to withstand ocean floor pressures. Each optical fiber 34 has a core 34a and cladding 34b.

The core includes a germanium dopant to raise the refractive index and produce the desired wave guide structure for transmitting digital light signals. The core is also doped with a rare-earth, (in the described embodiment erbium), which has good amplifier gain between about 1520 and 1560 nanometers (nm). Silica fibers have the lowest attenuation at 1550 nm and thus, the present system operates at or near the range of 1550 nm.

The rare-earth dopant praseodymium may also be used in the amplifier's fiber core if the system operates in the 1300 nm window, but its performance is not considered to be as good as the erbium-doped fibers. When praseodymium is used, it is best used in a fluoride silica glass. In accordance with the present invention, the rare-earth neodymium may also be used. However, the laser line is stronger near 1320 nm, but when doped in fibers, it does not amplify light well at the 1300 to 1310 nm wavelength of most fiber systems.

Figure 3:
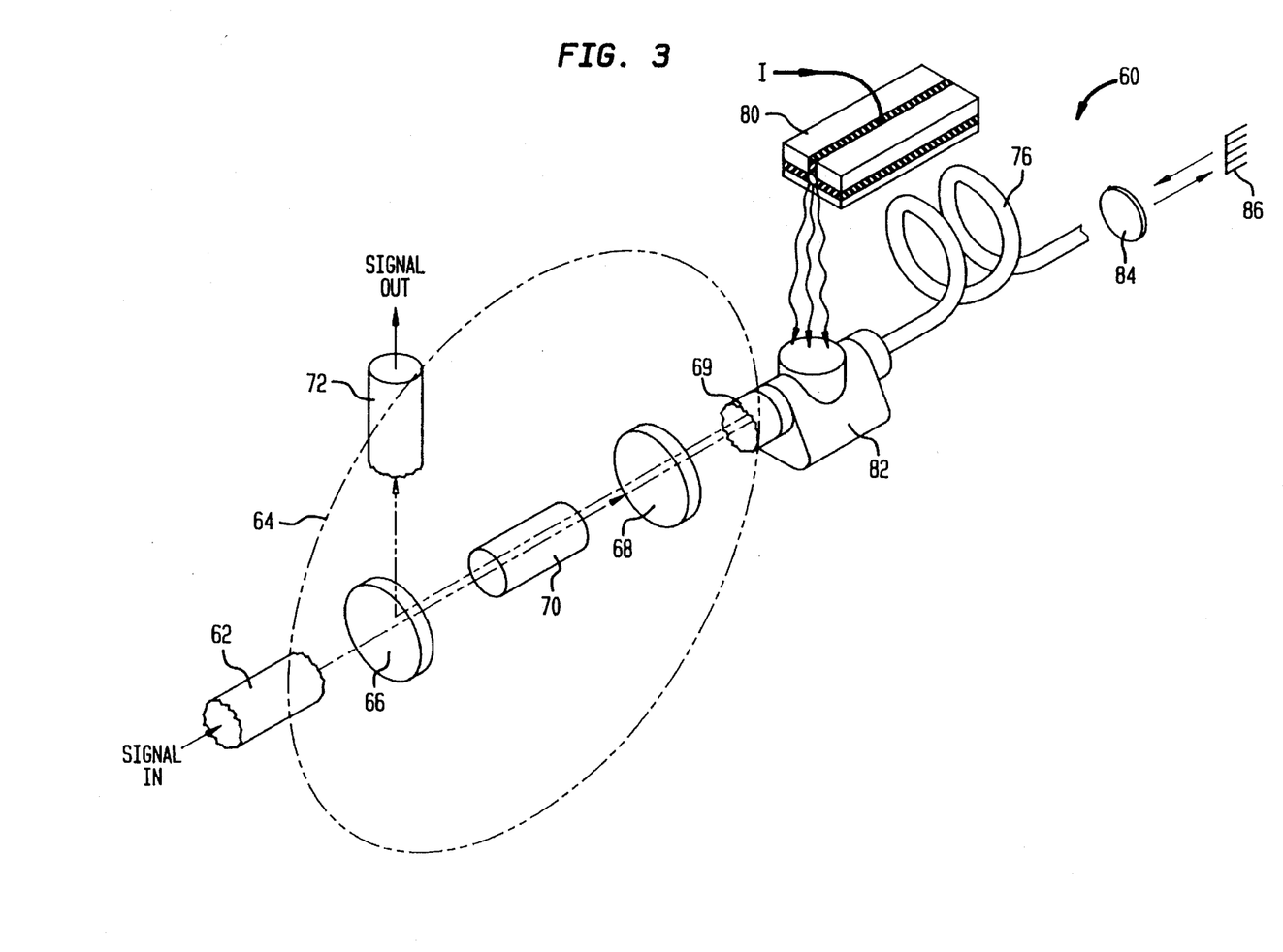
FIG. 3 is a schematic isometric view of a doped amplifier of the present invention when looking in the direction of arrow 3 in the amplifier station of FIG. 1.

FIG. 3 illustrates a schematic isometric of an optical amplifier, indicated at 60, of the present invention which could be contained within the amplifier station 12 of FIG. 1. The optical amplifier 60 of the present invention also works by stimulated emission so that the amplified light is in phase with the input signal, thus being much simpler than the prior generation electrooptic regenerators.

As shown in FIG. 3, a signal enters the first port 62 of a Faraday optical circulator 64. The illustration is simplified for explanation purposes to understand the concept of the present invention. Those skilled in the art will design the desired circulator for the system engineering requirements. The circulator 64 could be similar in design to a conventional isolator configuration, but additionally could include first and second calcite polarizing prisms 66, 68. In the desired embodiment, the circulator would be polarization independent. The foregoing description is simplified. The light signal is directed through the first calcite prism 66 and then through a Faraday rotator 70 material. The light signal then passes through the second calcite prism 68. The light signal exits the second port 69. Thus, any reflection beyond this second calcite prism 68 returns to the second prism and is rotated by the Faraday material 70. The reflected light is deflected by the first calcite prism 60 and exits out the third port 72.

The signal then passes into the erbium-doped fiber portion 76, where a semiconductor pump laser 80 continuously supplies photons with more energy than the erbium atoms emit. The pump laser can be powered by current in the cable.

The pump light wavelength emitted by the laser is shorter than the signal wavelength. The laser illustrated in FIG. 3 emits light at 1480 nm. In some cases Ytterbium can be added to the fiber to absorb light at other wavelengths, including the 1064 output of neodymium-YAG lasers. The Ytterbium can transfer the energy it absorbs to the erbium items, thus exciting the erbium atoms so that the fiber amplifier can be pumped with other wavelengths.

Praseodymium-doped fibers can amplify light at 1280 to 1330 nm when pumped with a laser at 1017 nm. Those skilled in the art will select the dopant fiber construction and laser depending on the engineering requirements of the particular transoceanic cable system.

Figure 5:
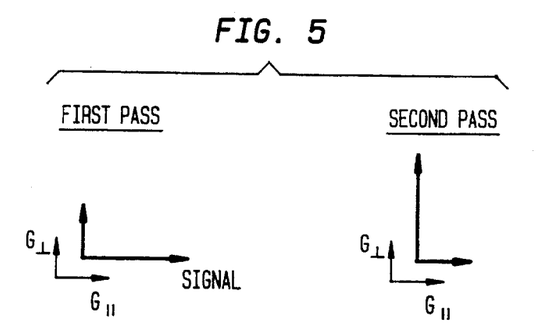
FIG. 5 is a general schematic view of the gain occurring in first and second passes of an optical amplifier.
Figure 6A:
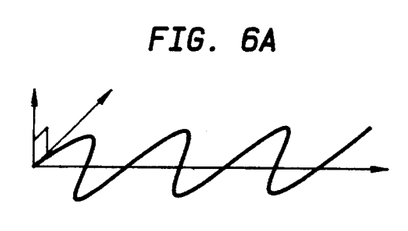
FIGS. 6A, 6B and 6C are general schematic views showing the light signal polarization in the first pass, the light signal polarization in the second return pass, and the average light signal polarization.

The light signal then enters the doped fiber portion 76 where it is stimulated by the pump light. In the illustrated embodiment, the system is co-propagating and both the pump and signal are reflected. The pump signal is preferably sent into a wavelength division multiplexor 82 which couples the 1480 nm pump and the 1550 signal. The signal is amplified as it passes through the erbium-doped fiber. FIG. 6A illustrates the signal in this first pass where the light is at an incident polarization, and is amplified as shown in FIG. 5.

Figure 6B:
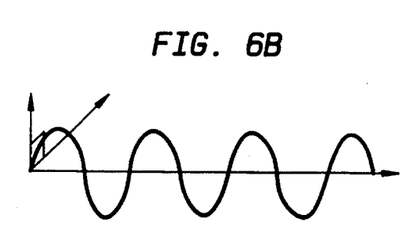
Figure 6C:
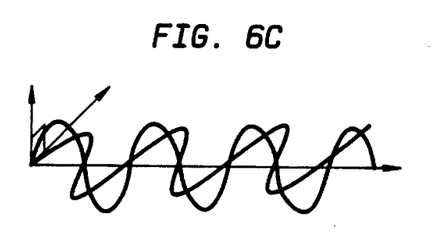

The signal then passes through a collimator 84 and to a Faraday effect mirror 86 (also known as an orthoconjugating mirror). The signal is reflected from the Faraday effect mirror 86. Whatever the incident polarized state the light had before it was reflected, the light signal now is reflected into its orthogonal polarization state as shown in FIG. 6B. In this second, reflected pass, the signal is then amplified again, but this time in its orthogonal polarization state, (FIG. 5). Thus, the overall average gain would be the gain difference of both the horizontal and perpendicular gain as shown in FIG. 6C. The overall gain effect would be similar to having an initial circular polarization where all the subpopulation of erbium ions are excited, so that there is no gain difference to the different axis of polarization.

The amplified signal then proceeds back into the optical circulator 64 where the reflected light signal is deflected by the first calcite prism 66 out the port. The signal then proceeds through the fiber optic communication system where it is attenuated and then amplified once again by an amplifier of the present invention. This process continues until the light signal reaches the receiver 18 (FIG. 1).

Other amplifier configurations besides the co-propagating amplifier with reflected signal and pump as illustrated in FIG. 3 also can be used as amplifiers for the present system.

Figure 8:
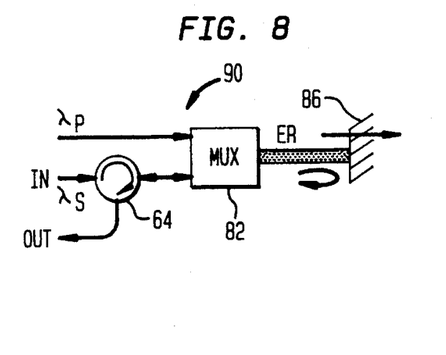
FIG. 8 is co-propagating amplifier where only the signal is reflected.
Figure 9:
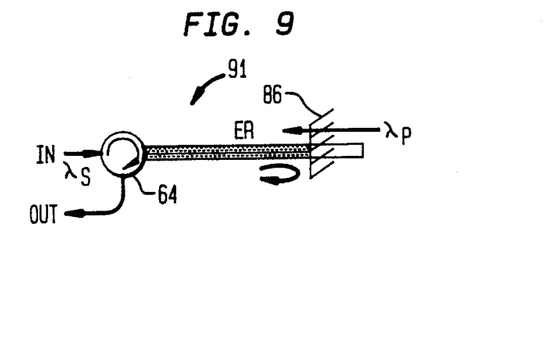
FIG. 9 is a counter-propagating amplifier where only the signal is reflected.

For example, in one aspect of the invention, the amplifier can be designed to reflect only the light signal and not the pump signal. FIG. 8 illustrates a co-propagating amplifier 90 with multiplexor 82 which reflects only the original signal and provides a high gain and increased pump rejection. FIG. 9 illustrates a counter-propagating amplifier 91 which reflects only the pump signal and provides high gain and no multiplexor.

Figure 10:
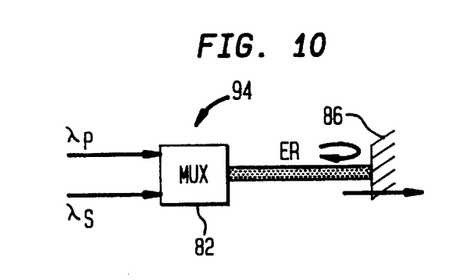
FIG. 10 is a co-propagating amplifier where only the pump is reflected.
Figure 11:
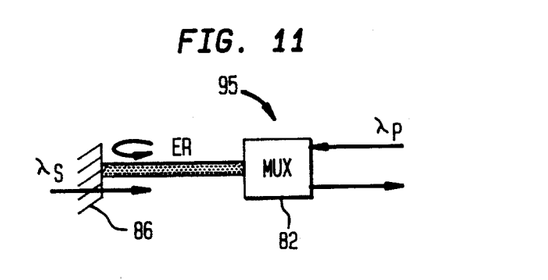
FIG. 11 is a counter-propagating amplifier where only the pump is reflected.
Figure 12:
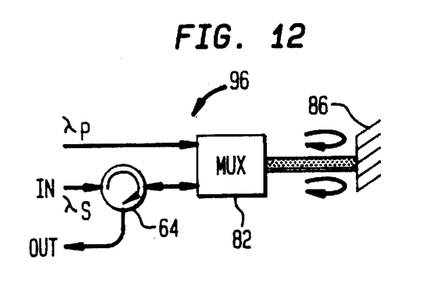
FIG. 12 is a co-propagating amplifier where both the signal and pump are reflected.
Figure 13:
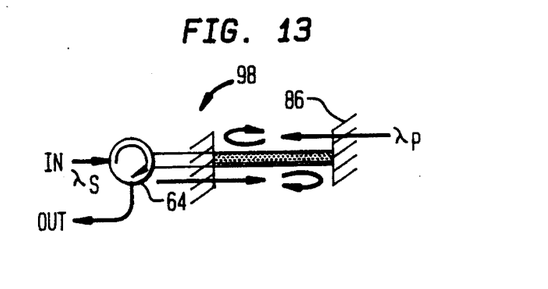
FIG. 13 is a counter-propagating amplifier where both the signal and pump are reflected.

Additionally, only the pump signal can be reflected. For example, FIG. 10 illustrates a co-propagating amplifier 94 with multiplexor 82 where only the pump signal is reflected. This amplifier 94 allows a lower pump threshold and higher saturation power. Alternatively, as shown in FIG. 11, a counter-propagating amplifier 95 with multiplexor allows a lower pump threshold and a higher saturation power. FIGS. 12 and 13 illustrate amplifiers which reflect both the signal and the pump. FIG. 12 illustrates a co-propagating amplifier 96 with multiplexor 82 similar to that amplifier design illustrated in FIG. 3. This design allows high gain and a lower pump threshold. FIG. 13 illustrates a counter-propagating amplifier 98 which provides a high gain, a lower pump threshold, and no multiplexor.

Figure 14:
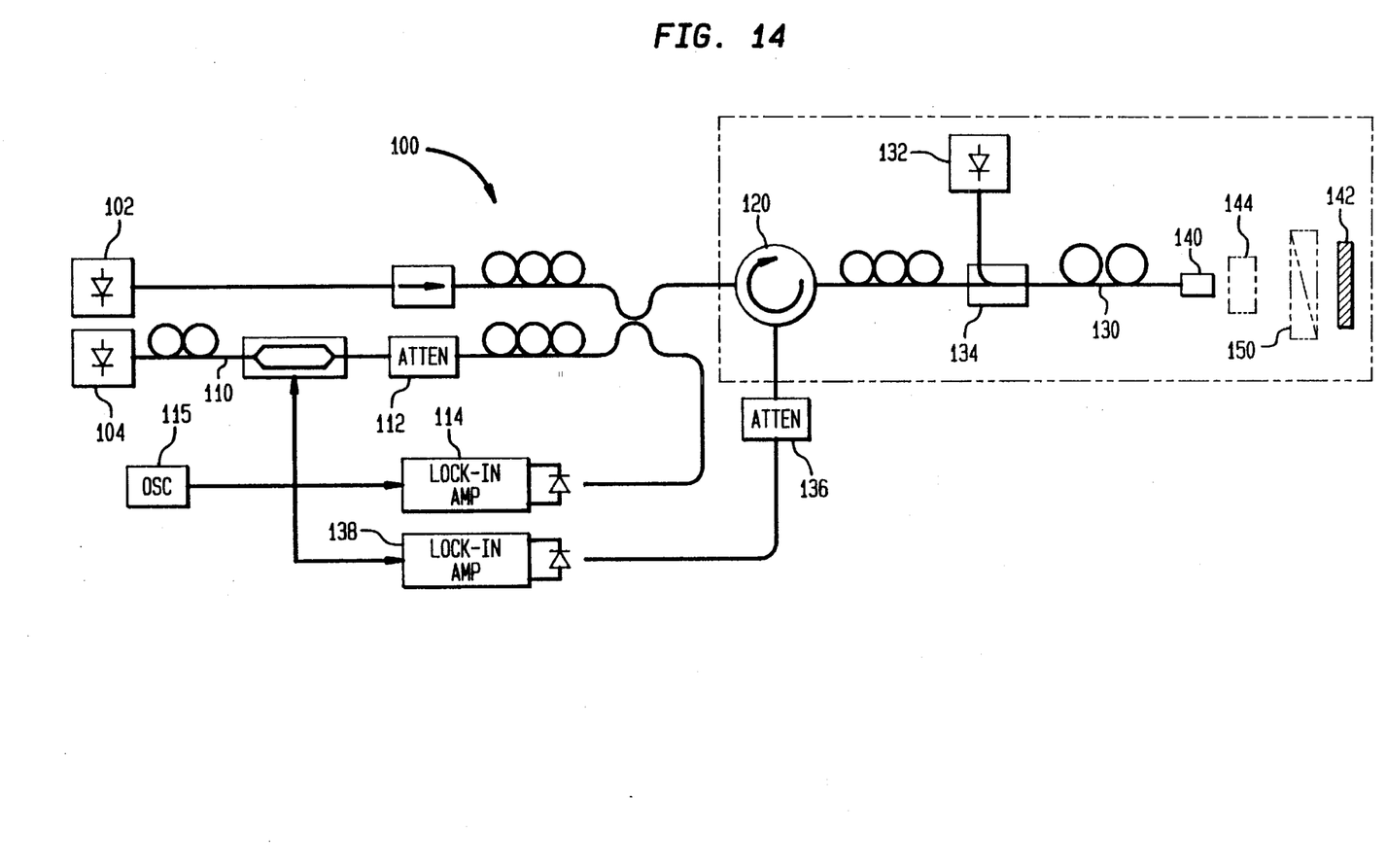
FIG. 14 is a schematic diagram of an experimental setup to measure gain anisotropy in a reflection-type erbium-doped amplifier.

FIG. 14 illustrates an experimental system 100 setup which was used for testing the method of the present invention. The system 100 uses a 1557 nm laser 102 and a tunable laser 104. For purposes of description, the amplifier will be referred to as a reflective amplifier because of the use of a Faraday effect mirror.

The light signal from the tunable laser 104 is directed through a collimator and modulator 110 and then through an attenuator 112 back into a lock-in amp 114 which receives input from a 100 kilohertz oscillator 115. This signal is merged with the 1557 nm laser signal which then goes through a circulator 120 The light signal passes through on erbium doped amplifier portion 130 which is pumped from a 1480 μm laser 132. The pump and signal merge at the multiplexor 134. The signal is reflected back in the circulator 120. The light signal is reflected out a third port of the optical circulator through an attenuator 136 and lock-in amplifier 138.

The input and output transmission losses of the three-port optical circulator were 1.5 dB and return losses of 30 dB. The erbium-doped fiber 130 length was 12 m, and was pumped by a laser 132 with 30 mW of 1480 nm light through an interference-filter type pump-signal multiplexor 134 to produce a double-pass small-signal gain of 18 dB at 1557 nm. The amplifier reflector consisted of a fiber-pigtailed GRIN-lens collimator 140 and an aluminum mirror 142. The reflector insertion loss was 1.0 dB. To demonstrate polarization holeburning and polarization dependent gain cancellation, a Faraday rotator 144 having a 45° single-pass rotation at 1550 nm was placed between the collimator 140 and reflector mirror 142.

By using the Faraday rotator, the reflected (second-pass) signal polarization is orthogonal to the first-pass signal polarization. The local gain coefficient at position z for a linearly polarized signal is:

$$g_o(z)+\delta gPHB(z)\sin^2(\theta)+\delta gPDG(z)\sin^2(\phi)$$

where $g_o$ is the minimum gain and $\delta gPHB$ and $\delta gPDG$ are the magnitude of the gains variations induced by polarization holeburning and the polarization dependent gain respectively. The angles ($\theta$) and ($\phi$) are between the signal polarization axis and the corresponding axes of the polarization holeburning and the polarization dependent gain. For the signal double-passed using the Faraday effect mirror.

$$g_{dp}(z)=2g_o(z)+\delta gPHB(z)(\sin^2(\theta)+\sin^2(\theta+90°))+\delta gPDG$$

$$(z)(\sin^2(\phi)+\sin^2((\phi+90°))=2g_o(z)+\delta gPHB(z)+\delta gPDG(z)$$

and the double-pass gain coefficient, $g_{dp}$, is independent of $\theta$ and $\phi$.

The double-pass amplifier gain is independent of signal polarization, and thus isotropic. It depends on δgPHB and δgPDG and may vary with the polarization states of saturating signals and of the pump. A worst-case estimate of the small variation in $g_{dp}$ can be found by using a simplified model where the erbium-ions are divided into two equal populations having their major axis of the σ-ellipsoid and the waveguide axis mutually perpendicular. For small signals and a ratio of a along the minor and major axes of 0.6, $g_{dp}$ varies less than 0.3% over the range of no pump-induced polarization dependent gain to maximum polarization dependent gain for a linearly-polarized pump at typical power levels. Similar numbers result for the residual changes in $g_{dp}$ caused by variations in polarization holeburning.

The cancellation of polarization holeburning and polarization dependent gain was demonstrated by measuring the dependence of gain saturation on the polarization states. A linear polarizer 150 was temporarily placed in the reflector path. Polarization adjusters were used to find linear polarization states that were either parallel or perpendicular to the polarizer transmission axis. Within the erbium fiber, these orthogonal polarization states are generally elliptical, varying with position, but varying slowly in time. The input probe beam, −25 dBm at 1557.1 nm wavelength, was externally modulated by an oscillator at 100 kHz and detected at the amplifier output using a PIN photodetector/lock-in amplifier. The CW saturating signal power was 1.0 dBm at 1557.0 nm and compressed the 18 dB small-signal gain by approximately 11 dB.

The output probe power was measured for two orthogonal polarization states, with and without the saturating signal turned on.

The gain differential, δG, of the two probe polarization states, collinear (∥) and orthogonal (⊥) of the saturating signal is:

$$\delta G=10\log((P_{sat\parallel}/P_\parallel)/(P_{sat\perp}P_{195})).$$

$P_{sat}$ and P are the measured probe output power with and without the saturating signal. This method has minimized systematic errors arising from polarization dependent loss in couplers and the optical circulator. Two data sets were obtained by alternately aligning the polarization state of the saturating signal to each of the two probe polarization states.

Figure 15:
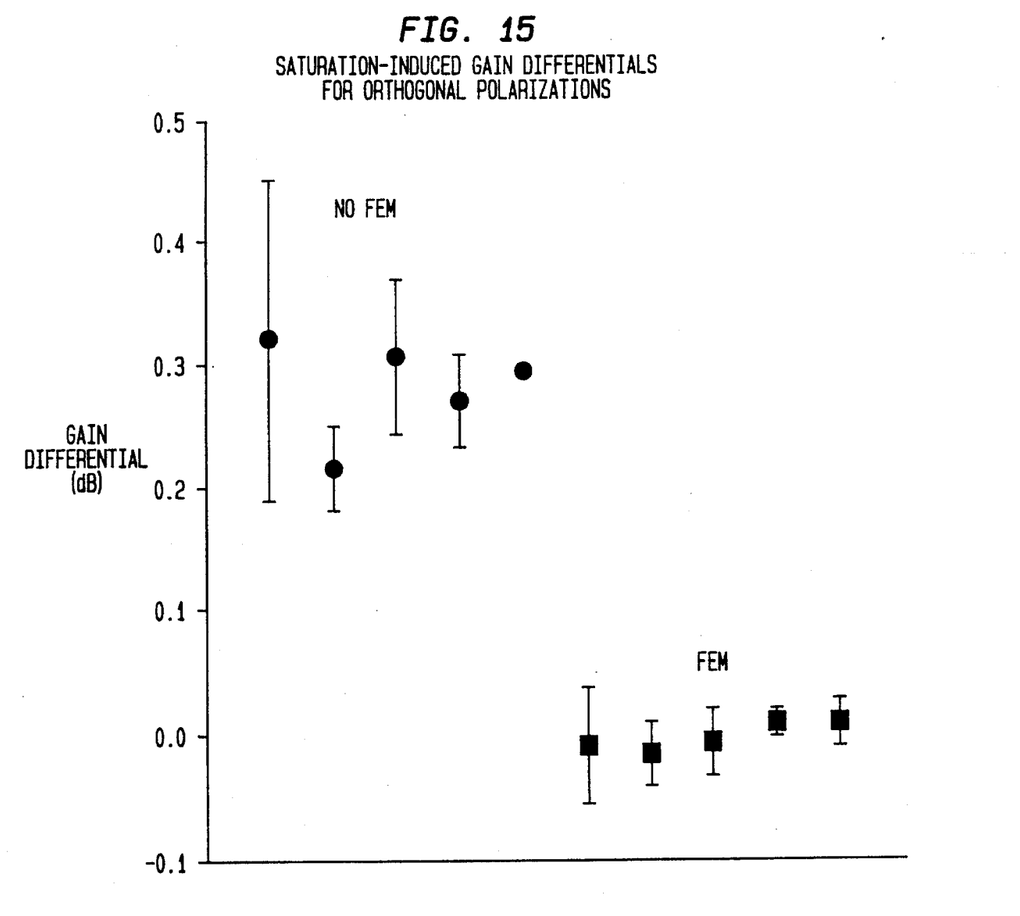
FIG. 15 is a chart showing the gain differential between orthogonal polarization states when a Faraday effect mirror is present and not present.

The measured gain differentials, δG, with and without the Faraday effect mirror (FEM), are shown in FIG. 15. The error bars indicate the measured gain differential for the two polarization states of the saturating signal and the data point is their mean. Each data pair was measured after randomly adjusting the polarization controller on the erbium-doped fiber in order to alter the evolution of polarization states in the fiber. The measurements were repeated five times for the cases without and with the Faraday rotator at the reflector.

Without the Faraday effect mirror, 0.19dB≦δG≦0.45dB, varying with the net polarization holeburning and polarization dependent gain which depended upon the polarization states of the saturating signal, probe and pump beams. Higher gain differentials are expected when the beams propagating in the saturated region of the erbium-doped fiber are linearly polarized. The average δG for all the measurements without Faraday rotation was 0.28dB. With the Faraday effect mirror, the average differential gain was 0.00±0.03 dB. This reduction in the gain differential clearly shows the cancellation of polarization holeburning and polarization dependent gain effects by retroreflecting the probe with the 90° rotation induced by the Faraday rotator. The saturating signal and residual pump are also rotated by the Faraday effect mirror, helping to reduce the magnitude of polarization holeburning and polarization dependent gain induced in the erbium-doped fiber.

In accordance with the present invention, the Faraday rotation of signals at the mirror of a double-pass erbium-doped fiber amplifier has been found to be an effective means of cancelling the effects of polarization holeburning and polarization-dependent gain. In the amplifier of the present invention, when an optical circulator for input and output ports was used, the polarization holeburning and polarization dependent gain-induced anisotropy in an amplifier having 11 dB gain compression was reduced from a mean value of 0.28 dB without the Faraday rotator to 0.00 dB with it in place. This method of suppressing gain anisotropy in erbium-doped fiber amplifiers is easy to implement and is beneficial in long distance light wave transmission systems that otherwise suffer from undesired signal fading.

It is to be understood that the above description is only one preferred embodiment of the invention. Numerous other arrangements may be devised by one skilled in the art without departing from the spirit and scope of the invention.

That which is claimed is:

1. An optical fiber system comprising An optical fiber having at least one rare-earth doped fiber portion for amplifying a light signal,
   means for passing a light signal through the doped fiber portion in a first incident polarized state,
   means for generating a pump signal at a pump wavelength into the doped fiber portion for exciting any rare-earth dopants.
   means for reflecting the light signal back through the doped fiber portion in its orthogonal polarized state so as to overcome the effects of polarization gain anisotropy, and
   wherein the amplified spontaneous emission generated by the rare-earth doped fiber portion when in its saturated state is greater in its polarization state orthogonal to the incident light signal as the light signal passes through said doped fiber portion, and wherein said amplified spontaneous emission is reflected back through the doped fiber portion in a polarization state perpendicular to its original state.

2. The optical fiber system according to claim 1 wherein said reflecting means comprises a Faraday effect mirror.

3. The optical fiber system according to claim 1 wherein said means for passing the light signal through said rare-earth doped fiber portion includes means for delivering the light signal into said doped portion through a first port and means for exiting said doped portion through a separate port.

4. The optical fiber system according to claim 3 wherein said means for passing said light signal comprises a Faraday optical circulator.

5. The optical fiber system according to claim 1 wherein said rare-earth doped fiber portion comprises a silica core having an erbium dopant.

6. The optical fiber system according to claim 1 including a wavelength division multiplexer coupler for merging the pump signal with the original light signal.

7. The optical fiber system according to claim 1 wherein said amplification portion is counter-propagating, and including means for generating a pump signal at a pump wavelength in the doped fiber portion in a direction opposite to the initial direction of the light signal.

8. An optical communication system comprising
   a transmitter for generating an information bearing light signal,
   a receiver of said information bearing light signal,
   an optical fiber communication link connected between the transmitter and receiver, said link including
   a series of spaced erbium-doped amplifiers interposed in said optical fiber communication link for amplifying the information bearing light signal as it advances along the series of spaced amplifiers, wherein each amplifier comprises
   an erbium-doped fiber portion,
   means for passing the information bearing light signal through the erbium-doped fiber portion in a first incident polarized state,
   means for generating pump signal at a pump wavelength into the doped fiber portions for exciting any rare-earth dopants.
   means for reflecting the information bearing light signal back through the erbium-doped fiber portion in its orthogonal polarized state so as to overcome the effects of polarization gain anisotropy,
   wherein the amplified spontaneous emission generated by an amplifier is greater in its polarization state orthogonal to the incident light signal as the light signal passes through said do:l fiber portion, and wherein said amplified spontaneous emission is reflected through the doped fiber in a polarization state perpendicular to its original state.

9. The optical communication system according to claim 8 wherein said reflecting means comprises a Faraday effect mirror.

10. The optical communication system according to claim 8 wherein said means for passing the information bearing light signal through said erbium-doped fiber portion includes means for passing the light signal through a first port into said erbium-doped fiber portion and means for exiting said doped fiber portion through a second port.

11. The optical communication system according to claim 10 wherein said means for passing said information bearing light signal comprises a Faraday optical circulator.

12. The optical communication system according to claim 8 including a wavelength division multiplexer coupler for merging the pump signal with the original light signal.

13. The optical communication system according to claim 8 wherein at least one amplifier is counter-propagating, and includes means for generating a pump signal at a pump wavelength into the erbium-doped fiber in a direction opposite to the initial direction of the original information bearing light signal.

14. An optical amplifier for use with optical fiber comprising
   an erbium-doped optical fiber,
   light entry means for passing a light signal through said doped optical fiber in a first incident polarized state,
   means for generating a pump signal at a pump wavelength into the doped optical fiber for exciting erbium dopants and amplifying the light signal,
   means for reflecting at least one of either the light signal or the pump signal back through the doped fiber portion in the orthogonal polarized state of the signal so as to overcome the effects of polarization gain anisotropy and
   wherein the amplified spontaneous emission generated by the rare-earth doped fiber portion when its saturated state is greater in its polarization state orthogonal to the incident light signal as the light signal passes through said doped fiber portion, and wherein said amplified spontaneous emission is reflected back through the doped fiber portion in a polarization state perpendicular its original state.

15. The optical amplifier according to claim 14 wherein said pump signal is reflected.

16. The optical amplifier according to claim 14 wherein said light signal is reflected.

17. The optical amplifier according to claim 14 wherein said light and pump signals are reflected.

18. The optical amplifier according to claim 14 wherein said reflecting means comprises a Faraday effect mirror.

19. The optical amplifier according to claim 18 including a Faraday optical circulator for initially passing light into said erbium-doped fiber through a first port and exiting said rotator through a second port.

20. The optical amplifier according to claim 14 including a wavelength division multiplexor coupler for merging the pump signal with the original light signal.

21. A method of overcoming the effects of polarization gain anisotropy in an optical fiber system having an optical amplifier with a rare-earth doped fiber portion comprising the steps of passing a light signal through the doped fiber portion, generating a pump signal at a pump wavelength into the doped fiber portion for exciting any rare-earth dopants, reflecting the light signal back through the doped fiber portion in its orthogonal polarized state so as to overcome the effects of the polarization gain anisotropy and including transmitting light to operate in a saturated state, and wherein the amplified spontaneous emission generated by the rare-earth doped fiber portion when in its saturated state is greater in its polarization state orthogonal to the incident light signal as the light signal passes through said doped fiber portion, and wherein said amplified spontaneous emission is reflected back through the doped fiber portion in a polarization state perpendicular its original state.

22. A method according to claim 21 wherein the light signal is reflected from a Faraday effect mirror.

23. A method according to claim 21 including the step of passing light through a first port of a Faraday optical circulator and into the doped fiber portion and then discharging the reflected light out of a second port of the Faraday optical circulator.

24. A method of overcoming the effects of polarization gain anisotropy in an optical communication system having an optical amplifier with an erbium-doped fiber portion comprising the steps of passing a information bearing light signal through the doped fiber portion in a first incident polarized state, while generating a pump signal at a pump wavelength into the erbium-doped fiber portion for exciting erbium dopants and amplifying the information bearing light signal, reflecting at least one of either the information bearing light signal or the pump signal back through the erbium-doped fiber portion in the orthogonal polarized state of the original light signal so as to overcome the effects of polarization gain anisotropy and including transmitting light to operate in a saturated state, and wherein the amplified spontaneous emission generated by the rare-earth doped fiber portion when in its saturated state is greater in its polarization state orthogonal to the incident light signal as the light signal passes through said doped fiber portion, and wherein said amplified spontaneous emission is reflected back.

25. The method according to claim 24 including the step of reflecting the pump signal.

26. The method according to claim 24 including the step of reflecting the information bearing light signal.

27. The method according to claim 24 including the step of reflecting the information bearing light signal and pump signal.

28. The method according to claim 24 including reflecting the information bearing light signal from a Faraday effect mirror.

29. The method according to claim 24 including the step of merging the pump and information bearing light signals in a wavelength division multiplexor coupler.

* * * * *